(12) United States Patent
Ogino et al.

(10) Patent No.: US 8,884,191 B2
(45) Date of Patent: Nov. 11, 2014

(54) VEHICLE HEATING SYSTEM

(75) Inventors: Hiroyuki Ogino, Nara (JP); Noriyuki Yoneno, Kyoto (JP); Hideaki Konishi, Nara (JP); Naohito Asami, Nara (JP); Satoshi Arima, Nara (JP)

(73) Assignee: Panasonic Corporation, Osaka (JP)

( * ) Notice: Subject to any disclaimer, the term of this patent is extended or adjusted under 35 U.S.C. 154(b) by 376 days.

(21) Appl. No.: 12/664,601

(22) PCT Filed: Jun. 13, 2008

(86) PCT No.: PCT/JP2008/001536
§ 371 (c)(1),
(2), (4) Date: Dec. 14, 2009

(87) PCT Pub. No.: WO2008/155893
PCT Pub. Date: Dec. 24, 2008

(65) Prior Publication Data
US 2010/0176110 A1 Jul. 15, 2010

(30) Foreign Application Priority Data

Jun. 15, 2007 (JP) .................................. 2007-158148

(51) Int. Cl.
*B60L 1/02* (2006.01)
*B60H 1/00* (2006.01)
*B60H 1/22* (2006.01)
*B60N 2/56* (2006.01)

(52) U.S. Cl.
CPC ........ *B60H 1/00271* (2013.01); *B60H 1/00285* (2013.01); *B60H 1/2218* (2013.01); *B60H 1/2225* (2013.01); *B60N 2/5685* (2013.01); *B60H 2001/2293* (2013.01)
USPC ......................................... 219/202; 219/217

(58) Field of Classification Search
CPC ............. B60H 1/00271; B60H 1/2218; B60H 2001/2293; B60H 1/00285; B60H 1/2225; B60N 2/5685
USPC ......... 219/202, 203, 205, 210, 212, 217, 507, 219/520, 529, 544, 549, 545, 501, 511, 508, 219/438, 490, 486, 497
See application file for complete search history.

(56) References Cited

U.S. PATENT DOCUMENTS

| 7,741,582 B2 * | 6/2010 | Howick et al. ................. 219/210 |
| 2004/0144771 A1 * | 7/2004 | Kleshchik ...................... 219/529 |

(Continued)

FOREIGN PATENT DOCUMENTS

| DE | 102004042440 | * | 8/2004 | ............... B60H 1/00 |
| DE | 102004042440 B3 | | 6/2006 | |

(Continued)

OTHER PUBLICATIONS

Decision on Grant for counterpart Russian Application No. 2009146282/11, dated Nov. 1, 2011, 10 pages.

(Continued)

*Primary Examiner* — Dana Ross
*Assistant Examiner* — Phuong Nguyen
(74) *Attorney, Agent, or Firm* — Brinks Gilson & Lione

(57) ABSTRACT

When a seat heater and a planar electric heater on a surface of an interior member are used in parallel, the seat heater and the planar electric heater cannot be heated sufficiently due to a limitation on an electric capacity of a vehicle, and in particular, in a vehicle having good engine efficiency, heating of an interior of a passenger compartment by air conditioning utilizing hot air generated by heat expelled from an engine is not sufficient, whereby there sometimes occurs a situation where occupants feel cold. A heating device 2 is provided in a side door panel 1 of a vehicle and a seat heater is made to be heated mainly at an initial stage of heating after an occupant gets in the vehicle, whereas the heating device 2 is made to be heated after a predetermined period of time elapses, whereby the body of the occupant can be warmed quickly and efficiently without making the occupant feel cold physically.

1 Claim, 10 Drawing Sheets

(56) References Cited

U.S. PATENT DOCUMENTS

2006/0076339 A1* 4/2006 Mohn et al. .................... 219/217
2006/0200285 A1* 9/2006 Obradovich .................... 701/30

FOREIGN PATENT DOCUMENTS

| | | |
|---|---|---|
| GB | 939292 | 10/1963 |
| JP | 61-222811 A | 10/1986 |
| JP | 63-075985 U | 5/1988 |
| JP | 63-147309 U | 9/1988 |
| JP | 01-123751 U | 8/1989 |
| JP | 02-029813 U | 2/1990 |
| JP | 02-061977 A | 3/1990 |
| JP | 02-262419 A | 10/1990 |
| JP | 04-007937 U | 1/1992 |
| JP | 04-071182 A | 3/1992 |
| JP | 09-102384 A | 4/1997 |
| JP | 2002-240177 A | 8/2002 |
| JP | 2002-316561 A | 10/2002 |
| JP | 2005-212556 A | 8/2005 |
| JP | 2006-076503 A | 3/2006 |
| JP | 2007-001355 A | 1/2007 |
| RU | 17479 U1 | 4/2001 |

OTHER PUBLICATIONS

Extended European Search Report for European Application No. 08764131.2, dated May 13, 2011, 5 pages.
International Search Report for International Application No. PCT/JP2008/001536, dated Jul. 8, 2008, 2 pages.

* cited by examiner

VEHICLE HEATING SYSTEM

TECHNICAL FIELD

The present invention relates to a heating system.

BACKGROUND ART

Conventionally, Patent Document 1 discloses a vehicle heating system of this type. In this related art, a planar electric heater is disposed along a surface of an interior member in a passenger compartment, and a heat radiating member which is made up of a material having a high heat radiation factor is disposed on a surface of the electric heater. Then, the heat radiating member is heated by heat generated by the electric heater, so that infrared radiation is radiated from a surface of the heat radiating member.
Patent Document 1: JP-A-2005-212556

DISCLOSURE OF THE INVENTION

Problem that the Invention is to Solve

In the related art, however, in a case where a seat heater which is made up of flexible planar heating elements which are installed under skins of a seat cushion and a seat back of a seat and a planar electric heater installed along the surface of an interior member are used as a vehicle heating system, the vehicle heating system has a problem that the seat heater and the planar electric heater cannot individually be heated sufficiently due to a limit on the electrical capacity of a vehicle.

The invention has been made in view of the aforesaid situations, and an object thereof is to provide a vehicle heating system which can provide a comfortable heated environment even within a limited electrical capacity.

Means for Solving the Problem

With a view to solving the problem inherent in the related art, a vehicle heating system according to the invention is characterized in that in controlling a heating device installed in an interior member within a passenger compartment and energization of a seat heater, making power to the seat heater is made larger than making power to the heating device (making power to the seat heater>making power to the heating device) for a predetermined period of time since energization is started, whereas after the predetermined period of time elapses, the making power to the heating device is made larger than the making power to the seat heater (the making power to the seat heater<the making power to the heating device).

Advantage of the Invention

The vehicle heating system of the invention can provide heating which makes occupants physically feel warmness without any discomfort feeling.

DESCRIPTION OF REFERENCE NUMERALS

1 side door panel (interior member); 2 heating device; 3 heat radiating member; 5 cover; 6 space portion; 7 mesh member; 8 speaker cover; 13 radiation collecting portion; 31 seat heater; 34 control device; 38 projecting portion

BEST MODE FOR CARRYING OUT THE INVENTION

Hereinafter, embodiments of the invention will be described by reference to the drawings. Note that the invention is not such as to be limited by these embodiments.

First Embodiment

A first embodiment of the invention will be described by reference to FIGS. 1 to 2.

Figure 1:
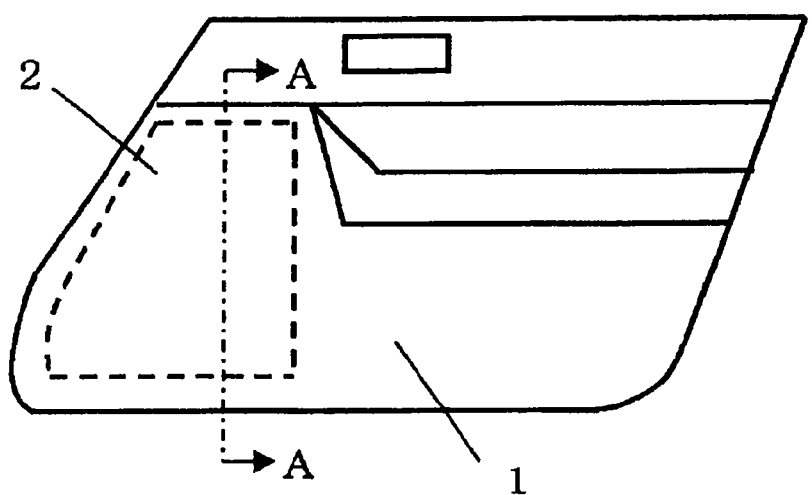
FIG. 1 An external view of a side door panel 1 provided with a vehicle heating system according to a first embodiment of the invention.

FIG. 1 is an external view of a side door panel 1 which includes a vehicle heating system according to the first embodiment of the invention. Here, the side door panel 1 is for a side door on a driver's seat side of a right-hand drive vehicle. In the drawing, a heating device 2 is installed in the side door panel 1 as an interior member. The heating device 2 is such that an extremely thin heater wire is snaked on a piece of nonwoven fabric so as to be formed into a sheet-like shape.

A thermistor is installed in the vicinity of the heater wire. In addition, although not shown, a control device is provided which controls energization of the heater wire such that an output of the thermistor becomes a set temperature which is preset.

Figure 2:
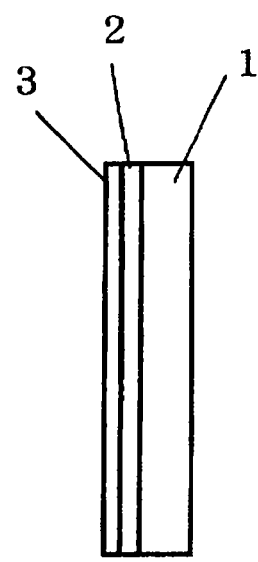
FIG. 2 A drawing showing a configuration of the vehicle heating system in a section taken along the line A-A in FIG. 1.

FIG. 2 is a drawing showing a configuration of the vehicle heating system in a section taken along the line A-A in FIG. 1. In the figure, the heating device 2 is installed on a surface of the side door panel 1, and a heat radiating member 3 is installed on a surface of the heating device 2. Note that when facing the drawing, a left-hand side denotes an internal side of a vehicle and a right-hand side denotes an external side of the vehicle. The heat radiating member 3 has a configuration in which, for example, a thin urethane sheet is bonded to a piece of planar fabric made of chemical fibers, and further, a raising treatment is applied to an internal surface of the heat radiating member 3 (a surface of the piece of fabric made of chemical fibers). The heating device 2 is installed in such a position that radiant heat is applied efficiently to the knee-thigh portions of a driver when he or she is seated.

According to the configuration described above, when the heater wire of the heating device 2 is energized, the energization of the heater wire is controlled by the control device so that the output of the thermistor becomes the set temperature which is preset. As this occurs, radiant heat is generated from the heat radiating member 3 due to heat generated by the heater wire, and the radiant heat so generated is then radiated to the knee-thigh portions of the driver who is being seated, whereby the knee-thigh portions of the driver are warmed.

In addition, should part of the body of the driver be brought into contact with the heat radiating member 3, since the raising treatment is applied to the surface of the heat radiating member 3 to give it a large contact heat resistance, heat from the heating device 2 is made difficult to be conducted, and there will be no such situation that the part of the body of the drive which is in contact with the heat radiating member 3 is heated more than required.

In addition, in the embodiment, while the raising treatment is applied to the surface of the heat radiating member 3, a configuration may be adopted in which a graining or embossing treatment is applied to the surface of the heat radiating member 3 so as to increase the contact heat resistance, and the invention is not limited to the embodiment described above, and any configuration may be adopted, provided that the contact heat resistance is increased.

Additionally, a side door panel whose heat conductivity is lower than a heat conductivity of the heat radiating member 3 is preferably selected as the side door panel 1. According to this configuration, heat generated by the heating device 2 is made difficult to be conducted to the side door panel 1 for dissipation, whereby heat radiation from the heat radiating member 3 is implemented efficiently.

In addition, although there is a case where a speaker of an in-car audio system is mounted in the side door panel 1, as this occurs, a configuration may be adopted in which the heating device 2 is installed in the side door panel 1 while avoiding the place where the speaker is installed.

Second Embodiment

A second embodiment of the invention will be described by reference to FIG. 3.

Figure 3:
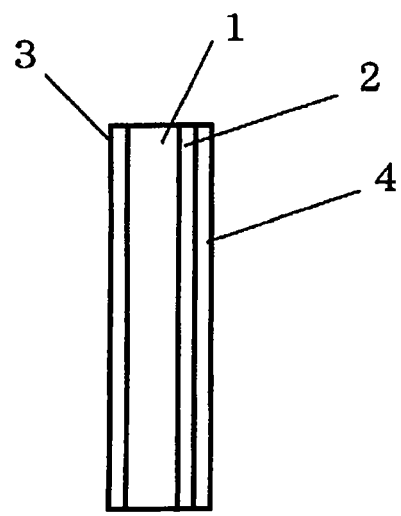
FIG. 3 A drawing showing a configuration in a section taken along the line A-A of a second embodiment of the invention.

FIG. 3 is a drawing showing the configuration of this embodiment in a section which corresponds to the section taken along the line A-A in FIG. 1. In this embodiment, as is shown in FIG. 3, a heating device 2 is installed on an external side of a side door panel 1, and a heat radiating member 3 is installed on an internal side thereof. In addition, a heat insulating member 4 is installed on an external surface of the heating device 2. As the side door panel 1 in this embodiment, a material having good heat conducting properties, for example, a composite material in which metallic particles are kneaded with a resin is used in at least an area where the heating device 2 is installed.

Heat generated in the heating device 2 is conducted efficiently to the heat radiating member 3 by the heat insulating member 4 and the side door panel 1 having good heat conducting properties to thereby be radiated to the internal side of the side door panel 1. In addition, since the heating device 2 is not installed on the internal side of the side door panel 1, there is caused no defective with respect to an external appearance of the side door panel 1 such as a local protuberance by the heater wire.

Third Embodiment

A third embodiment of the invention will be described by reference to FIG. 4.

Figure 4:
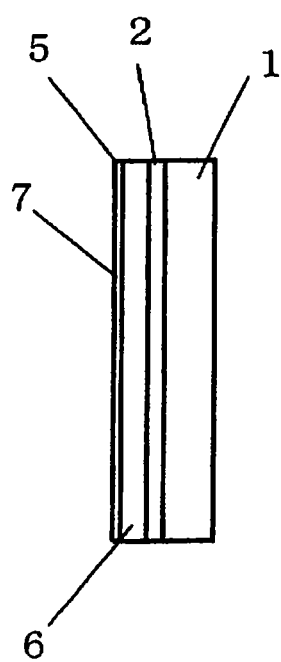
FIG. 4 A drawing showing a configuration of a third embodiment of the invention.

FIG. 4 is a drawing showing the configuration of this embodiment and corresponds to the section taken along the line A-A in FIG. 1. In this embodiment, as is shown in FIG. 4, a heating device 2 is installed in a side door panel 1, and a cover 5 is provided which covers the heating device 2 and transmits heat radiation generated from the heating device 2. When facing the drawing, a left-hand side denotes an internal side of a vehicle and a right-hand side denotes an external side of the vehicle.

The cover 5 includes a space portion 6 between the heating device 2 and itself and a covering surface thereof has a mesh member 6 which has a predetermined aperture ratio. The space portion 6 is formed by providing a spacer or the like between the heating device 2 and the mesh member 7. The mesh member 7 is made up by forming, for example, a thin metallic or resin wire into a grid-like or grille-like shape to provide the predetermined aperture ratio. In addition, similar to the first embodiment, the heating device 2 is such that an extremely thin heater wire is snaked on a piece of nonwoven fabric so as to be formed into a sheet-like shape.

In addition, in order to increase the efficiency of heat radiation to an internal side of a passenger compartment, the heater wire is installed on a surface of the piece of nonwoven fabric on the internal side of the passenger compartment. A thermistor is installed in the vicinity of the heater wire. Additionally, although not shown, a control device is provided which controls energization of the heater wire so that an output of the thermistor becomes a set temperature which is preset.

According to the configuration described above, when the heater wire of the heating device 2 is energized, the energization of the heater wire is controlled by the control device so that the output of the thermistor becomes the set temperature which is preset. As this occurs, radiant heat is generated by the heater wire being so heated, and the radiant heat so generated is transmitted through openings in the mesh member 7 so as to be radiated to the knee-thigh portions of the driver who is being seated, whereby the knee-thigh portions of the driver are warmed.

In addition, should part of the body of the driver be brought into contact with the mesh member 7, since the mesh member 7 itself transmits the heat radiated by the heating device 2 and is not heated, there is eliminated a possibility that the part of the body of the driver which is in contact with the mesh member 7 is heated more than required.

Additionally, a raising treatment, graining treatment or embossing treatment may be applied to the surface of the metallic or resin heater wire which is used for the mesh member 7, and as this occurs, the contact heat resistance of the mesh member 6 is increased, and hence, there is eliminated further the possibility that the part of the body of the drive which is in contact with the mesh member 7 is heated more than required.

In addition, in the embodiment, while the configuration is adopted in which the cover 5 includes the space portion 6 between the heating device 2 and itself and has the mesh member 6 whose covering surface has the predetermined aperture ratio, a configuration may be adopted in which the covering surface is made up by forming an infrared radiation transmissive material such as a high-density polyethylene into a sheet-like shape, a film-like shape, a grid-like shape, a grille-like shape or the like, and as this occurs, since radiated heat in an area of infrared radiation which can be absorbed by a human body is allowed to be transmitted therethrough, a similar advantage is provided.

Fourth Embodiment

Figure 5:
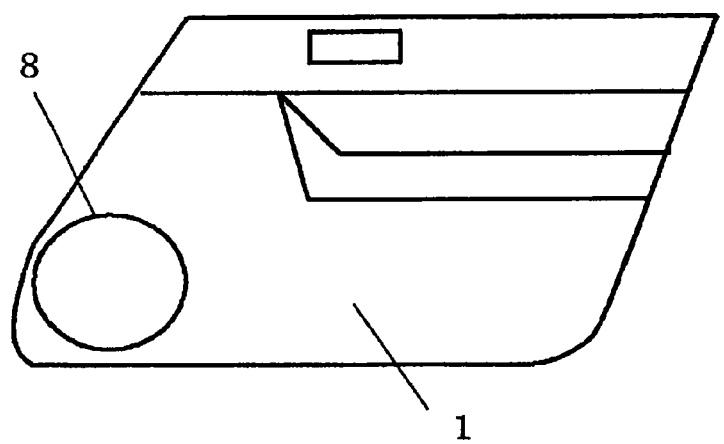
FIG. 5 (a) is an external view of a side door panel 1 to which a fourth embodiment of the invention is applied, and (b) is a drawing showing a configuration made up of a speaker cover 8, a heating device 2, and a speaker 9.
Figure 5:
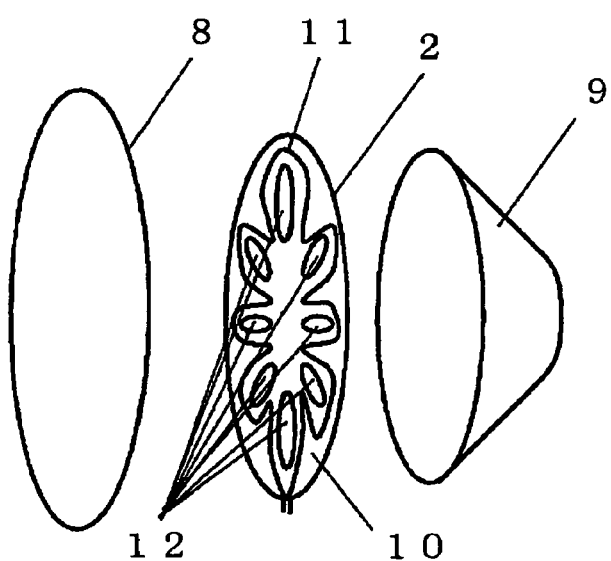

A fourth embodiment of the invention will be described by reference to FIG. 5.

FIG. 5(a) is an external view of a side door panel 1 to which this embodiment is applied, and FIG. 5(b) is a drawing showing a configuration made up of a speaker cover 8, a heating device 2 and a speaker 9. As shown in FIGS. 5(a), 5(b), in this embodiment, a configuration is adopted in which the mesh member of the third embodiment is made to double as the speaker cover 8 for an in-car audio system which is provided in the door panel. The speaker cover 8 has a predetermined aperture ratio as with the mesh member of the third embodiment. In addition, the heating device 2 is installed between the speaker cover 8 and the speaker 9. As is shown in FIG. 5(b), the heating device 2 adopts a configuration in which a heater wire 11 is snaked on a piece of nonwoven fabric 10 and a plurality of transmissive hole portions 12 are provided in the piece of nonwoven fabric 10 so as to allow sound from the speaker 9 to be transmitted therethrough. The heating device 2 and the speaker cover 8, and the heating device 2 and the speaker 9 are joined together, respectively, to provide a predetermined space therebetween via a spacer.

According to the configuration described above, when the heater wire of the heating device 2 is energized, as with the third embodiment, the energization of the heater wire is controlled by the control device so that an output of the thermistor becomes a set temperature which is preset. As this occurs, radiant heat is generated by the heater wire being so heated and is then transmitted through the openings in the speaker cover 8 to thereby be radiated to the knee-thigh portions of a driver who is being seated, whereby the knee-thigh portions of the driver are warmed.

In addition, even in the event that part of the body of the driver is brought into contact with the speaker cover 8, since the speaker cover 8 itself transmits the radiant heat from the heating device 2 and is not heated, there is eliminated a possibility that the part of the body of the drive which is in contact with the speaker cover 8 is heated more than required.

Additionally, since the configuration is adopted in which the plurality of transmissive hole portions 12 are provided in the piece of nonwoven fabric 10 of the heating device 2 so as to allow sound from the speaker 9 to be transmitted therethrough, there is eliminated a possibility that the function of the speaker as a normal one for an in-car audio system is damaged.

Fifth Embodiment

Figure 6:
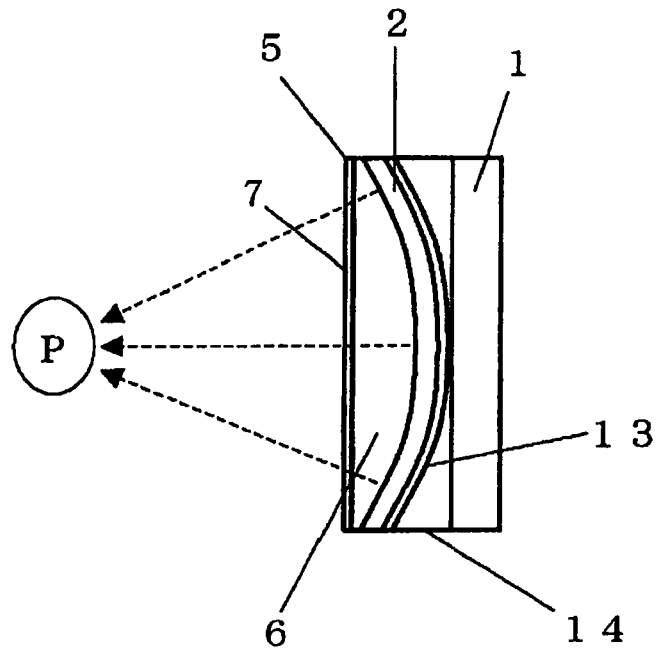
FIG. 6 (a) is a drawing showing the configuration of a fifth embodiment of the invention, and (b) is an external view of the fifth embodiment which is installed in a surface of a ceiling within a passenger compartment.
Figure 6:
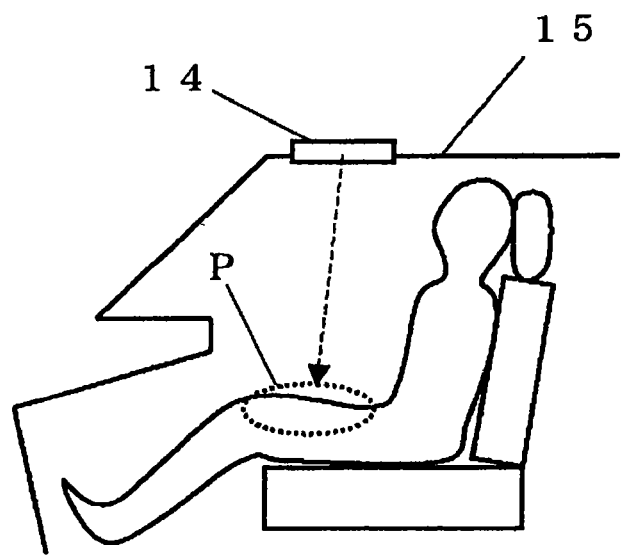

A fifth embodiment of the invention will be described by reference to FIG. 6.

FIG. 6a is a drawing showing the configuration of this embodiment (and corresponding to the section taken along the line A-A in FIG. 1) and FIG. 6b is an external view of the embodiment which is installed in a surface of a ceiling within a passenger compartment. In this embodiment, as is shown in FIG. 6(a), a heating device 2 includes a radiation collecting portion 13 for collecting generated heat radiation to a predetermined location. The radiation collecting portion 13 has a concave lens-like shape. Here, an integration of the heating device 2, a space portion 6, and a mesh member 7 is referred to as a heater unit 14.

According to the configuration described above, when a heater wire of the heating device 2 is energized, as with the third embodiment, the energization of the heater wire is controlled by the control device so that an output of the thermistor becomes a set temperature which is preset. Radiant heat generated by the heater wire being heated is radiated to the vicinity of a point P by the radiation collecting portion 13. Then, as is shown in FIG. 6(b), in the event that the heater unit 14 configured as described above is installed in a surface of a ceiling lying above the femoral portions of an occupant such that the femoral portions constitute the heat radiation collecting location P where radiant heat is collected by the radiation collecting portion 13, radiant heat from the heater unit 14 is collected so as to be radiated to the femoral portions, whereby the femoral portions are warmed up.

As in the case of the first to fourth embodiments, in the event that radiation heating is equipped for the feet to lower leg portions and, for example, a seat heater is equipped which is made up of flexible planar heating elements which are installed under skins of a seat cushion and a seat back of a seat, although the thigh portions and the posterior femoral portions are warmed, it is not until the interior of the passenger compartment is warmed up by the air conditioner in the heating mode as a result of the warming up of the engine being completed that the anterior femoral portions are warmed. On the other hand, according to this embodiment, since the radiant heat from the heater unit 14 installed in the surface of the ceiling is collected so as to be radiated to the femoral portions, the anterior femoral portions can be warmed up quickly, whereby the physical warm sensation that is felt by the occupant is increased.

Sixth Embodiment

Figure 7:
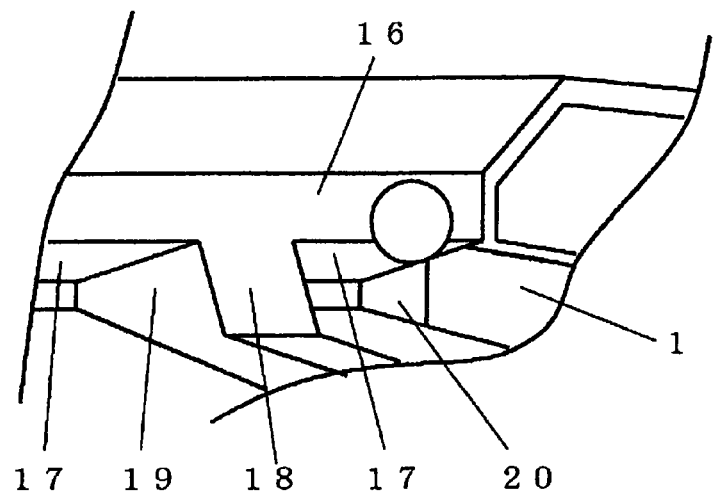
FIG. 7 (a) is an external view of a passenger compartment to which a sixth embodiment of the invention which is applied, which external view results when the passenger compartment is seen from the rear thereof, and (b) is an external view of the passenger compartment to which the sixth embodiment is applied, which external view results when the passenger compartment is seen from the side thereof.
Figure 7:
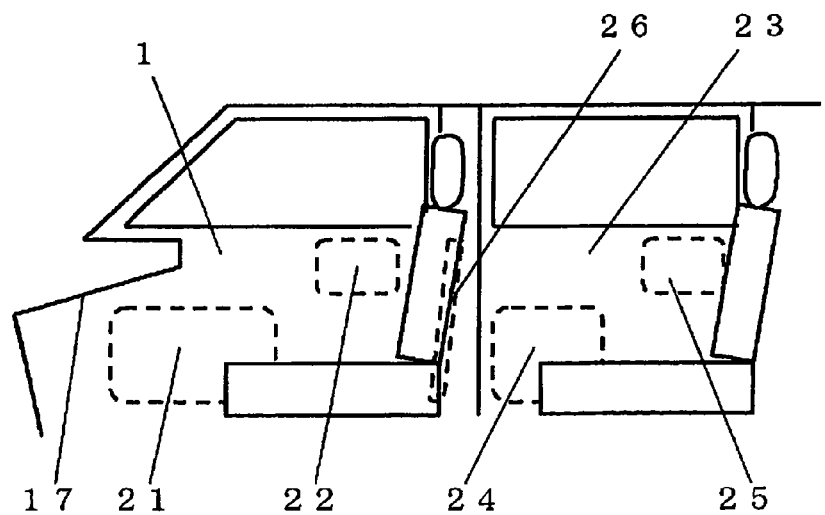

A sixth embodiment of the invention will be described by reference to FIG. 7.

FIG. 7(a) is an external view of a passenger compartment to which this embodiment is applied, which external view results when the passenger compartment is seen from the rear thereof, and FIG. 7(b) is an external view of the passenger compartment to which the embodiment is applied, which external view results when the passenger compartment is seen from the side thereof. While the heating device 2 is installed in a location 21 on the side door panel 1 on the driver's seat side which faces the feet to lower leg portions of the driver who is seated in the driver's seat in the first embodiment, as is shown in FIG. 7(a), the heating device 2 may be installed in interior members such as lower portions 17 of an instrument panel 16, left and right lateral surfaces 19 of a center console 18, and a body's side surface 20 which lies on a lateral side of an accelerator pedal.

In addition, as is shown in FIG. 7(b), the heating device 2 may be installed in interior members which lie in a location 22 on a side door panel 1 which faces the shoulder of an occupant who is seated in a front seat, a location 24 on a side door panel 23 for a rear seat which faces the feet to lower leg portions of an occupant who is seated in the rear seat and a location 25 which faces the shoulder of the occupant who is seated in the rear seat. In addition, the heating device 2 may be installed in a back side portion 26 of the front seat so that radiant heat is radiated to the feet to leg portions of the occupant who is seated in the rear seat. Additionally, although not shown, the heating device 2 may be installed in armrests equipped on the seats and the side door panels and portions of the floor which lie in front of the seats.

Seventh Embodiment

A seventh embodiment of the invention will be described by reference to FIG. 8.

Figure 8:
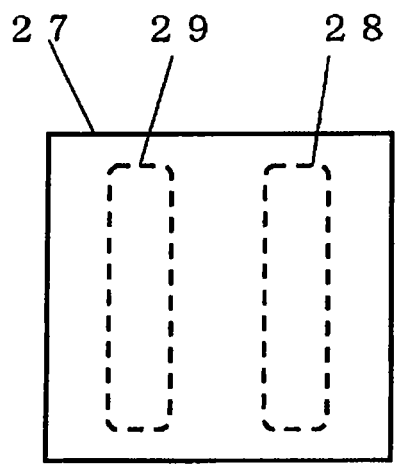
FIG. 8 An external view of a heater unit 27 of a seventh embodiment of the invention.

FIG. 8 is an external view of a heater unit 27 of this embodiment. As is shown in FIGS. 7(*a*), 7(*b*), the heater unit 27 includes two heating device 28, 29. Note that the heat radiating members and the cover which are described in any of the first to fifth embodiments are to be used for the heating device 28, 29. In addition, when the heater unit 27 is installed in a lower portion 17 of an instrument panel 16, the heating device 28, 29 are made to face the right leg portion and left leg portion of an occupant along the length thereof, respectively. In particular, in the event that the heater unit 27 is applied to the driver's seat side of an automatic vehicle, since the right leg portion and left leg portions are positions in such a state that the right foot is placed towards a direction of the accelerator pedal and the left foot is placed on a footrest, the heating device 28, 29 may be configured so as to be installed to face the positions of the leg portions, respectively.

According to the configuration described above, when the heating device 28, 29 are energized, radiant heat generated by the heating device 28, 29 being heated is radiated to the right leg portion and the left leg portion of the occupant seated in the seat, whereby both the legs of the occupant are warmed. In addition, since the heating device 28, 29 are installed separately so as to face the right leg portion and the left leg portion along the length thereof, compared with a configuration in which a heating device is installed on the whole surface of the heater unit 27, not only can the heating device be rationalized, but also consumed power at the time of heating can be reduced, so as to provide an energy saving effect.

While the heater wire is used as the heating device 2 in the first to seventh embodiments that have been described heretofore, for example, a planar heater having PTC properties may be used, which provides an advantage that the heater is not heated to an excessive heater temperature, the safety of the heater being thereby increased.

Eighth Embodiment

An eighth embodiment of the invention will be described by reference to FIG. 9.

Figure 9:
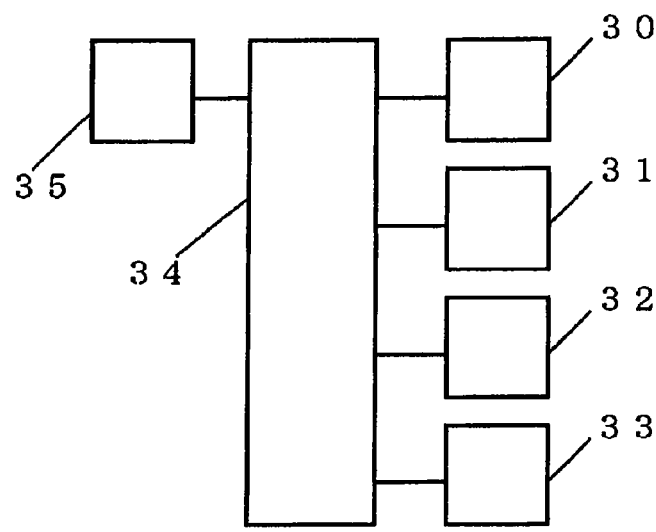
FIG. 9 (a) is a block diagram of a vehicle heating system of an eighth embodiment of the invention, and (b) is an operation diagram showing a control mode of the vehicle heating system.
Figure 9:
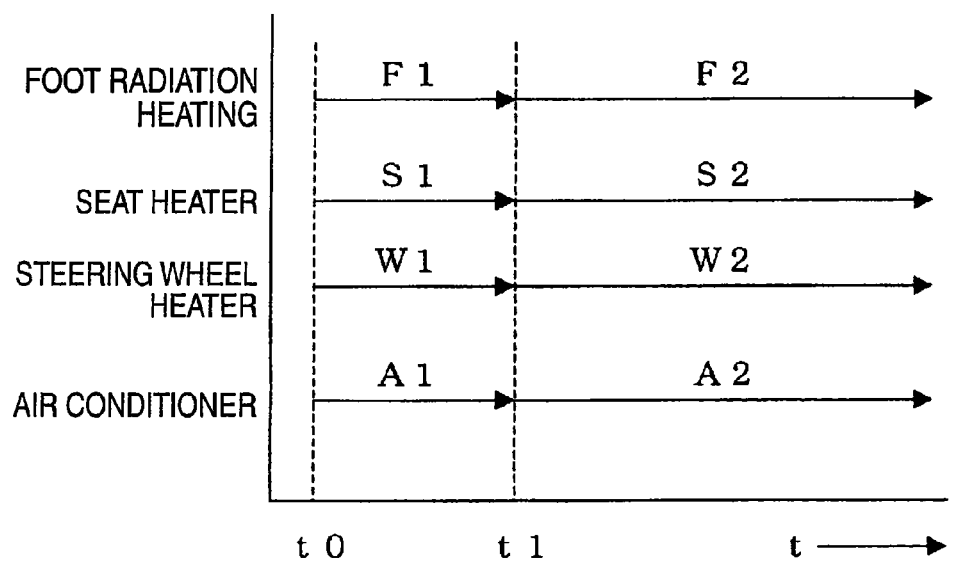

FIG. 9(*a*) is a block diagram of a vehicle heating system of this embodiment, and FIG. 9(*b*) is an operation diagram showing a control mode of the vehicle heating system. As is shown in FIG. 9(*a*), this embodiment includes, as a vehicle heating system, foot radiation heating 30 like the heating device for warming the knee-thigh portions which is described in the first to fourth embodiments, for example, a seat heater 31 which is made up of flexible planar heating elements which are installed under skins of a seat cushion and a seat back of a seat, a steering wheel heater 32 in which a heater wire is incorporated in a steering heater, and an air conditioner 33. A control device 34 controls the operation of the foot radiation heating 30, the seat heater 31, the steering heater 32 and the air conditioner 33 when receiving a temperature signal of a temperature sensor 34 of an engine. The seat heater 31 is made up of the flexible planar heating elements, for which a flexible planar heating element which is formed by placing a heater wire on a thin resin sheet of a piece of nonwoven fabric to be snaked thereon or a planar heating element which is made by printing or pressure bonding thinly a resin resister having PTC properties on to a piece of nonwoven fabric or a thin resin sheet is used. In addition, the planar heating elements may be configured such that heating portions are locally set in such a way as to face at least part of body portions of the occupant such as, for example, lower portions of both the femoral portions and buttocks, lumber part, spine, scapula and upper arms so as to warm at least part of those portions, whereby the heating area can be reduced, compared with the configuration in which the planar heating elements are installed over the whole areas of the seat cushion and the seat back of the seat, so as to save electric power.

The operation of the configuration described above will be described by the use of FIG. 9(*b*). When the driver gets in the vehicle and the foot radiation heating, the seat heater, the steering wheel heater and the air conditioner are actuated at a time t0, the control device 34 starts heating by the respective heating devices in F1, S1, W1 and A1 modes (these modes being referred to as S1). Here, the F1, S1 and W1 modes are full energization modes. The A1 mode is a preheating mode which corresponds to a so-called warming up operation of the engine, and no air is blown out during the preheating mode.

Next, when the temperature of the engine reaches a predetermined temperature at a time t1, the F1, S1, W1 and A1 modes are changed to F2, S2, W2 and A2 modes (these modes being referred to as S2). Here, the F2, S2 and W2 modes are modes for controlling intermittently energization on/off intervals and set temperatures and are preferably modes for controlling the same in a pattern of 1/f fluctuation so as to make the constituent heating devices operate in an energy saving fashion while maintaining comfortableness.

By the controlling modes described above, at the initial time period after the driver gets in the vehicle, the body of the driver can be warmed quickly and efficiently through radiation heating and contact heating by the foot radiation heating, the seat heater and the steering wheel heater which are made to operate as main heating sources. In addition, when the engine is warmed up, the interior of the passenger compartment is warmed by the air conditioner which is made to operate as a main heating source, while the body of the driver can be warmed through radiation heating and contact heating in an auxiliary fashion by the foot radiation heating, the seat heater, and the steering wheel heater which are made to operate as sub-heating sources while suppressing the utilization of electric power. In this way, according to the embodiment, at the initial stage of heating, the comfortableness can be increased with regard for quick heating characteristics, and at the stable heating stage, the energy saving characteristics can be made compatible with the comfortableness.

Ninth Embodiment

A ninth embodiment of the invention will be described by reference to FIG. 10.

Figure 10:
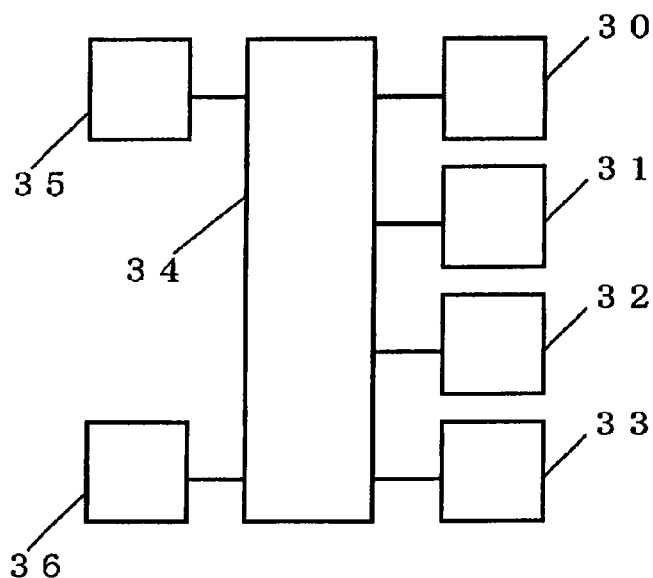
FIG. 10 (a) is a block diagram of a vehicle heating system of a ninth embodiment of the invention, and (b) is an operation diagram showing a control mode of the vehicle heating system.
Figure 10:
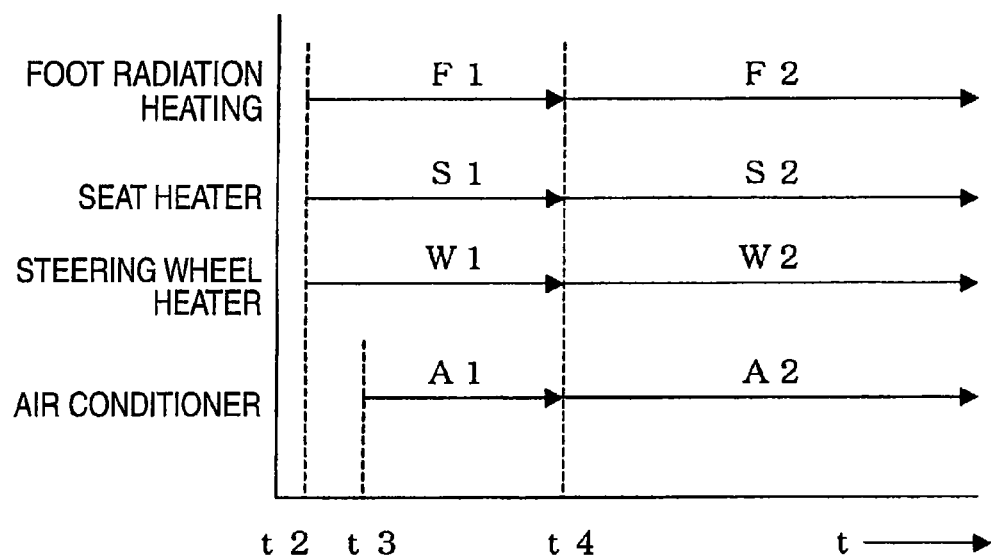

FIG. 10(*a*) is a block diagram of a vehicle heating system of this embodiment, and FIG. 10(*b*) is an operation diagram showing a control mode of the vehicle heating system. As is shown in FIG. 10(*a*), this embodiment includes, as a vehicle heating system, foot radiation heating 30 like the heating device for warming the knee-thigh portions which is described in the first to fourth embodiments, a seat heater 31, a steering wheel heater 32, and an air conditioner 33. A control device 34 controls the operation of the foot radiation heating 30, the seat heater 31, the steering heater 32 and the air conditioner 33 when receiving a temperature signal of a temperature sensor 35 of an engine and a determination signal of a touch sensor 36 of an outer door handle on a side door on a driver's seat side. As the touch sensor 36, for example, a sensor is used which is configured such that detection electrodes are installed in the door handle for detection of a change in electrostatic capacity or a piezoelectric sensor is installed in a movable portion of the door handle for detection of vibration or displacement of the movable portion which is produced by the door handle being operated.

The operation of the configuration described above will be described by the use of FIG. 10(b). When the outer door handle on the side door on the driver's seat side is operated at a time t2 by the driver who attempts to get in the vehicle, the control device 34 starts heating by the foot radiation heating, the seat heater and the steering wheel heater in F1, S1, and W1 modes. Here, the F1, S1 and W1 modes are full energization modes. Then, when the driver gets in the vehicle and actuates the air conditioner at a time t3, the air conditioner is actuated to operate in a preheating mode denoted by A1 which corresponds to a so-called warming up operation of the engine. No air is blown out during the preheating mode.

Next, when the temperature of the engine reaches a predetermined temperature at a time t4, the F1, S1, W1 and A1 modes are changed to F2, S2, W2 and A2 modes. Here, the F2, S2 and W2 modes are modes for controlling intermittently energization on/off intervals and set temperatures and are preferably modes for controlling the same in a pattern of 1/f fluctuation so as to make the constituent heating devices operate in an energy saving fashion while maintaining comfortableness. The A2 mode is a hot air blowing out mode.

By the controlling modes described above, the heating by the foot radiation heating, the seat heater and the steering wheel heater is started before the driver gets in the vehicle, so that the start of heating is in a completed state by the time when the driver gets in the vehicle, whereby the body of the driver can be warmed quickly and efficiently through radiation heating and contact heating. In addition, when the engine is warmed up, the interior of the passenger compartment can be warmed via heating by the air conditioner which is made to operate as a main heating source, while the body of the driver can be warmed through radiation heating and contact heating in an auxiliary fashion by the foot radiation heating, the seat heater and the steering wheel heater which are made to operate as sub-heating sources while suppressing the utilization of electric power. In this way, according to the embodiment, since the radiation heating and contact heating are activated by detecting the operation of the door handle before the driver gets in the vehicle, the driver is allowed to feel the warm sensation as soon as he or she gets in the vehicle, whereby can the comfortableness be increased further, but also the energy saving characteristics can be made compatible with the comfortableness when heating gets stable.

Tenth Embodiment

A tenth embodiment of the invention will be described by reference to FIG. 11.

Figure 11:
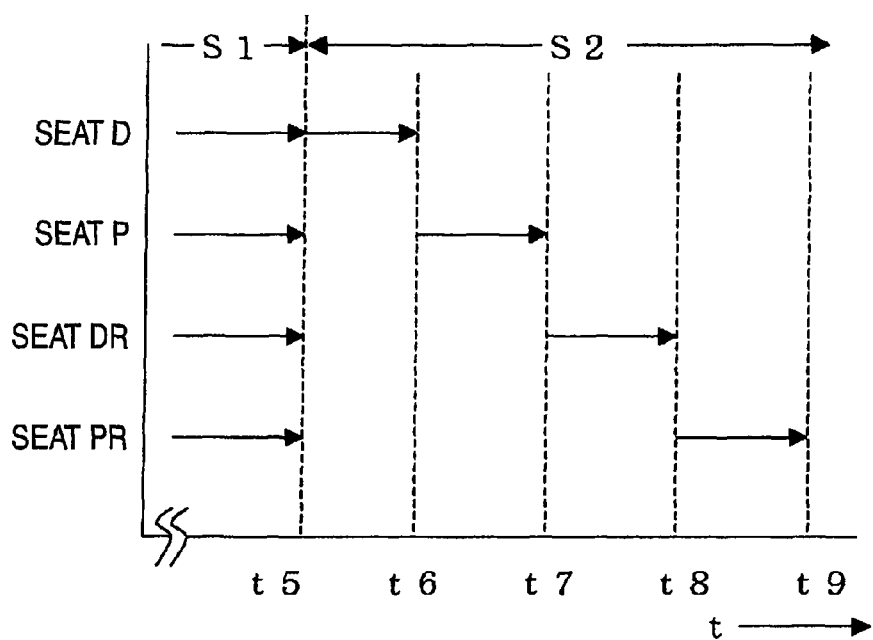
FIG. 11 An operation diagram showing a control mode of vehicle heating system of a tenth embodiment of the invention.

FIG. 11 is a drawing showing a controlling mode of a vehicle heating system of this embodiment. This embodiment is applied to the controlling mode S2 of the seat heater of the eighth embodiment. In this embodiment, seat heaters are installed individually in a driver's seat (seat D), a front passenger's seat (seat P), a driver's seat side rear seat (seat DR) and a front passenger's seat side rear seat (seat PR). Note that although energization of the seat heater in each seat is implemented by an energization switch provided therein, a configuration may be adopted in which an occupant detection sensor is installed in each seat, so that only the seat or seats are energized where occupants are detected. In the following description, it is understood that all the four seats are occupied by occupants.

The operation of the configuration described above will be described by the use of FIG. 11. In the controlling mode S1, the seat D, seat P, seat DR and seat PR are all energized. Then, when the controlling mode S1 is shifted to the controlling mode S2 at a time t5, only the seat D is energized from the time t5 to a time t6, only the seat P is energized from the time t6 to a time t7, only the seat DR is energized from the time t7 to a time t8, and only the seat PR is energized from the time t8 to a time t9, and from the time t9 onward the operations performed from the time t5 to time t9 are controlled so as to be repeated. With a control like this in which the energization of the seat is switched from seat to seat, it takes time to complete one cycle (t5 to t9), and there is a fear that the temperatures of the seats are reduced during the cycle. However, since urethane used for seat cushions of the seats has heat insulating properties and the occupants seated in the seats have heat capacities, once the temperatures of the seats are increased by heat generated by the seat heaters being energized, the reduction in temperature of the seats is moderate even after the energization thereto is stopped, and the occupants continue to feel the warm sensation. Note that depending on the temperature within the passenger compartment, a time required to complete one cycle is desirably 3 to 5 minutes. In addition, in the operation of the configuration described above, although the four seats are regarded as objects to be controlled for energization, in the event that the occupant detection sensor installed in the seat PR, for example, determines that no occupant is seated in the seat PR, the seat PR is not energized, and the energization switching control is implemented among the seats D, P and DR.

The energy saving can be increased further by the controlling mode for switching the energization of the seats from seat to seat in the way described above.

Note that while the seat heaters are described as being objects to be controlled for energization in the tenth embodiment, objects to be so controlled are not limited to the seat heaters. For example, a configuration may be adopted in which the foot radiation heating and the seat heaters are energized alternately or the energization on/off intervals or set temperatures are controlled in a pattern of 1/f fluctuation, so that energy saving and comfortableness can be made compatible with each other.

Eleventh Embodiment

An eleventh embodiment of the invention will be described by reference to FIG. 12.

Figure 12:
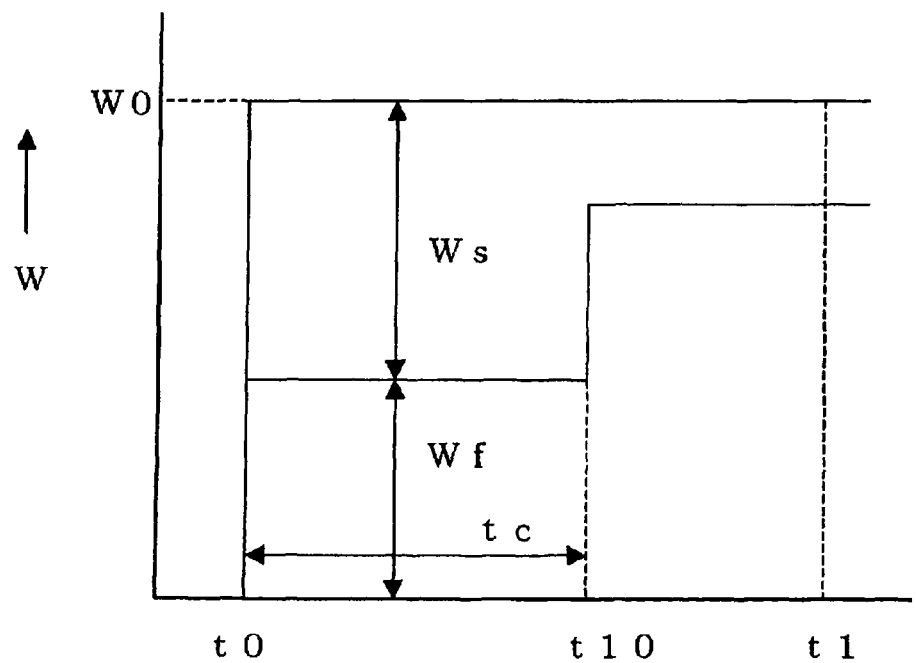
FIG. 12 An operation diagram showing a control mode of vehicle heating system of an eleventh embodiment of the invention.

FIG. 12 is an operation diagram showing a controlling mode of a vehicle heating system of this embodiment. This embodiment is applied to the controlling mode S1 of the foot radiation heating 30 and the seat heater 31 of the eighth embodiment. In this embodiment, as is shown in FIG. 12, a control device 34 controls the distribution of making power Wf, Ws to the foot radiation heating 30 as the heating device and the seat heater 31 such that Ws>Wf for a duration from the start of energization at a time t0 until a predetermined length of time tc has elapsed since the time t0 and controls such that Ws<Wf from a time t10 at which the predetermined length of time has elapsed onward. Note that a total amount of making power to the foot radiation heating 30 and the seat heater 31 should not surpass W0.

By the controlling mode described above, at an initial stage of heating, the making power is concentrated to the seat heater 31 so as to be heated quickly to thereby warm the trunk portion of an occupant, whereas after the predetermined length of time tc has elapsed, the making power is concentrated to the foot radiation heating 30 so as to increase radiant heat to the feet of the occupant to thereby warm the feet of the occupant to a higher level. In addition, although there is a fear that the temperature of the seat is reduced when the supply of making power to the seat heater 31 is reduced from the time t10 onward, since urethane used for a seat cushion of the seat has heat insulating properties and the occupant seated in the seat has heat capacity, once the temperature of the seat is increased by heat generated by the seat heater 31 being energized, the reduction in temperature of the seat is moderate even though the making power is reduced, and the occupant continues to feel the warm sensation.

Thus, according to this embodiment, for example, even though an initial temperature within the passenger compartment becomes 0° C. or lower under a severe cold weather in winter, the occupant can feel sufficiently the warm sensation at the initial stage of heating. In addition, even though energy that can be used is limited to increase the fuel economy as in a hybrid vehicle, efficient heating can be implemented by controlling the distribution of making power to the foot radiation heating 30 and the seat heater 31 with time within the total electric power W0 in the way described above.

In addition, while in the embodiment, the distribution of making power to the foot radiation heating 30 and the seat heater 31 is controlled based on the predetermined length of time tc, a configuration may be adopted in which temperature sensors are installed in the seat heater 31 and the seat, so that the distribution of making power to the foot radiation heating 30 and the seat heater 31 is controlled by detecting that the temperatures of the seat heater 31 and the seat have reached predetermined temperatures, and a similar advantage to that described above can also be obtained by this configuration. Namely, under the same configuration as that of the embodiment described above, the control device 34 obtains the temperature of the seat heater 31 or the seat from either of the temperature sensors and controls the distribution of making power Wf, Ws to the foot radiation heating 30 and the seat heater 31 such that Ws>Wf until the temperature reaches the predetermined temperature, whereas when the temperature has reached the predetermined temperature, the control device 34 controls the distribution of making power such that Ws<Wf.

In addition, while in the embodiment described above, the foot radiation heating 30 is used as the heating device installed in the interior member, a configuration may be adopted in which a plurality of heating device are used by providing, in addition to the foot radiation heating 30, a ceiling radiation heater for radiating heat mainly to the upper half body of the occupant to warm it up and a door trim heater installed in the side door panel. By this configuration, at the initial stage of heating, can the making power be concentrated to the seat heater 31 so as to be heated quickly to thereby warm the trunk portion of the occupant, but also the foot radiation heating 30, the ceiling radiation heater and the door trim heater can be heated together by the making power Wf distributed thereto, so as to eliminate at least the sensation of being cooled felt by the occupant at the feet, head portion and shoulder thereof, whereas after the predetermined length of time tc has elapsed, the making power is concentrated to the foot radiation heating 30, the ceiling radiation heater and the door trim heater so as to increase radiation of heat to the feet, head portion and shoulder of the occupant to thereby provide a mild warm sensation through radiation, thereby making it possible to increase comfortableness.

Additionally, while in the embodiment above, one seat is described as being an object to be controlled with respect to energization thereof, for example, in a case where heating of the driver's seat and the front passenger's seat is assumed, a configuration may be adopted in which the distribution of the total making power W0 to the individual heaters is implemented based on detection of occupants being seated in the seats by seat occupation detection sensors so as to control the energization of the seats. The function of the configuration above will be described below. Note that foot radiation heating is installed to be opposed to each of the seats and that the seat heater and the seat occupation detection sensor are installed in each of the seats.

Firstly, when only the driver's seat is detected as being occupied, as in the embodiment described above, the control is implemented for distributing the total making power W0 to the foot radiation heating on the driver's seat side and the seat heater of the driver's seat. Next, when both the driver's seat and the front passenger's seat are detected as being occupied, the total making power W0 is distributed equally between the driver's seat and the front passenger's seat, and only the seat heaters in the respective seats are firstly energized by the power W0/2 so distributed thereto. Then, after the predetermined length of time tc has elapsed, in each seat, the power W0/2 distributed thereto is divided between the foot radiation heating and the seat heater at a predetermined dividing ratio. The dividing ratio is such that power to the foot radiation heating>power to the seat heater. In this case, before the predetermined length of time tc has elapsed, the foot radiation heating is not energized. Although the comfortableness is reduced by such an extent that the foot radiation heating stays off, standing on a viewpoint that energy saving takes priority over comfortableness, such a control is implemented that only the trunk portion of the occupant is warmed quickly by the seat heater as required minimum heating that is to be implemented within the frame of the total making power W0. By the control being implemented in the way described above, heating appropriate to the number of occupants can be enabled while realizing energy saving.

In addition, a configuration may be adopted in which for example, the foot radiation heating and the ceiling radiation heater are energized alternately for a predetermined length of time so as to implement radiation heating alternately, whereby there is eliminated a possibility that the head portion is warmed excessively by the continuous energization of the ceiling radiation heater, comfortableness being thereby increased.

Additionally, although a motor vehicle for use in a cold region has a configuration in which an electric heater is additionally provided in an air duct to air outlets as auxiliary heating to main hot air heating which utilizes heat expelled from the engine, in the event that the foot radiation heating 30, the ceiling radiation heating, the door trim heater and the seat heater 31 of the vehicle heating system of the invention are used in place of the electric heater, the occupant is allowed to feel the warm sensation quickly at the initial stage of heating with the same making power as that of the electric heater.

For example, when the making power of the electric heater is 600 W and there are four seats to be heated, a power of 150 W is allocated to each seat and the power of 150 W so allocated can be divided to the foot radiation heating 30, the ceiling radiation heater, the door trim heater, and the seat heater 31, and heating is implemented in an energization pattern like the energization pattern of the eleventh embodiment. By this, for example, in a case where there are two occupants; the driver and the front passenger, power that is used for the two seats becomes 300 W only, and compared with the power used by the electric heater, energy corresponding to 300 W can be saved, whereby the amount of electricity that has to be generated by the alternator can be reduced by such an extent that the energy is so saved, which decreases the fuel consumption. In addition, since the physically sensed temperature by the occupant is increased by making use of contact heating and radiation heating in parallel, a temperature that is set within the passenger compartment at the time of heating can be reduced compared with the case where the electric heater is used. Because of this, the load applied to the air conditioner can be reduced, and therefore, since the engine does not have to be revolved to generate to expel therefrom as much heat as before, the revolution of the engine can be reduced by such an extent that the air conditioner's load is reduced, and hence, it becomes possible to increase the fuel economy further.

In addition, as a configuration for the energy saving energization control described above, for example, an energy saving heating system may be adopted in which an energy saving mode switch is provided within the passenger compartment, and when the energy saving mode switch is turned on, a set temperature for the air conditioner is set lower than the normal level (for example, 15 to 18° C.), and the contact heating and the radiation heating are combined together for control in the way described above.

Additionally, as the radiation heating, a configuration may be adopted in which radiation heaters are installed above a window frame of the side door on the driver's seat side and in the center pillar in addition to the foot radiation heating 30 so as to warm the upper half body of the occupant to thereby mitigate cold radiation from the side window glass, or in which a headrest of the seat is formed into a parabolic shape for installation of a radiation heater therein so as to concentrate radiant heat to the head to neck portions of the occupant to thereby warm these portions.

Figure 13:
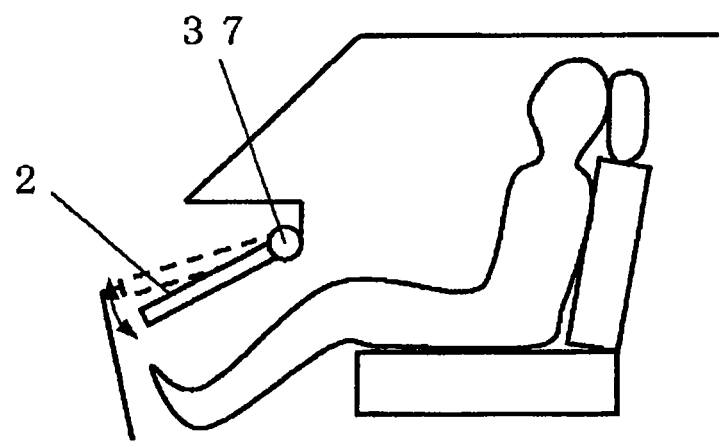
FIG. 13 A drawing showing a configuration of a heating device of another embodiment of the invention.

In addition, as to the foot radiation heating 30, as is shown in FIG. 13, the installation angle of the heating device 2 may be adjustable by, for example, a hinge portion 37, whereby efficient radiation heating can be enabled depending upon the size and posture of the thigh portions of the occupant.

Figure 14:
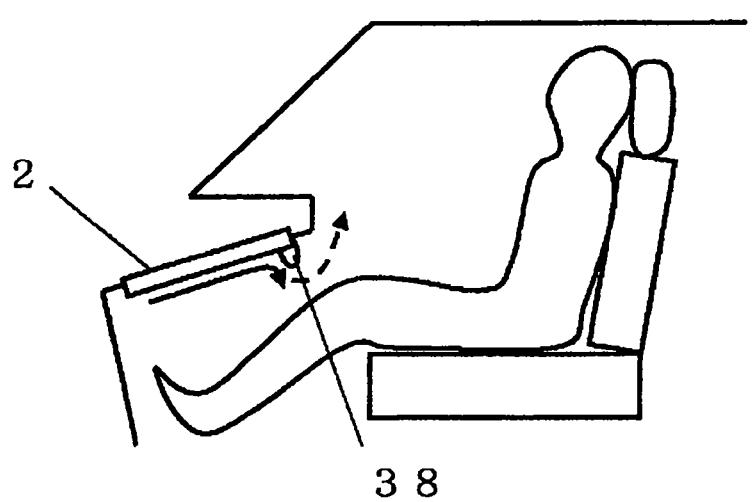
FIG. 14 A drawing showing a configuration a heating device of a further embodiment of the invention.

Additionally, as is shown in FIG. 14, a configuration may be adopted in which a belt-like projecting portion 38 is provided in part of the heating device 2 or part of an interior member lying in the vicinity of the heating device 2, whereby the generation of a rising airflow by natural convention generated on the surface of the heating device 2 is suppressed, whereby the occupant is prevented from feeling a sensation of uncomfortable airflow. In addition, the projecting portion has a function to accumulate warmed air in the vicinity of the feet of the occupant, whereby the temperature of air accumulated at the feet of the occupant can be increased so as to improve the warm sensation which is felt by the occupant.

Thus, while the individual embodiments of the invention have been described heretofore, the invention is not limited to the matters described in the respective embodiments, and hence, modifications and applications which are made by those skilled in the art to which the invention pertains based on the description of the specification and known technologies are expected to be incorporated in part of the invention and hence constitute the range to be protected.

This patent application is based on the Japanese Patent Application No. 2007-158248 filed on Jun. 15, 2007, and all the contents thereof are to be incorporated herein by reference.

INDUSTRIAL APPLICABILITY

As has been described heretofore, in the vehicle heating system of the invention, since even in the event that the occupant is brought into contact therewith during the radiation heating, the occupant is prevented from being heated more than required, the vehicle heating system of the invention can be applied to radiation heating appliances with which part of a human body is easy to be brought into contact during usage, including, for example, a desk heater, a riser heater, an electric foot warmer and the like.

The invention claimed is:

1. A vehicle heating system comprising:
a heating device comprising a foot radiation heater installed in an interior member within a passenger compartment and comprising a foot heater;
a seat heater;
a control device for independently controlling energization to the heating device and the seat heater; and
seat occupation detection sensors that detect occupants seated in a driver's seat and a front passenger's seat,
wherein, when only the driver's seat is detected as occupied, the control device sets a relationship between making power Wf to the heating device and making power Ws to the seat heater such that Ws>Wf in a first heating mode for a first time period after energization is started, and the control device sets a relationship such that Ws<Wf in a second heating mode for a second time period following the first time period after the first time period has elapsed, and
wherein, when both the driver's seat and the front passenger's seat are detected as occupied, the total making power (WO) is distributed equally between the driver's seat and the front passenger's seat and the control device, and, after the predetermined length of time from the start of energization has elapsed, the control device sets the relationship Ws<Wf,
wherein the control device sets a relationship between making power Wf to the heating device and making power Ws to the seat heater such that Ws>Wf for a period of time from the start of energization until a temperature of the seat heater reaches a predetermined temperature, whereas the control device sets the relationship such that Ws<Wf from a time when the temperature of the seat heater has reached the predetermined temperature onward.

* * * * *